United States Patent
Wicht et al.

(10) Patent No.: US 8,631,696 B2
(45) Date of Patent: Jan. 21, 2014

(54) APPARATUS AND METHOD FOR MONITORING TANKS IN AN INVENTORY MANAGEMENT SYSTEM

(75) Inventors: Fernand Wicht, Fribourg (CH); Bin Sai, Zuid Holland (NL)

(73) Assignee: Enraf, B.V., Delft (NL)

( * ) Notice: Subject to any disclaimer, the term of this patent is extended or adjusted under 35 U.S.C. 154(b) by 370 days.

(21) Appl. No.: 12/467,012

(22) Filed: May 15, 2009

(65) Prior Publication Data

US 2010/0037673 A1     Feb. 18, 2010

Related U.S. Application Data

(60) Provisional application No. 61/088,226, filed on Aug. 12, 2008.

(51) Int. Cl.
G01F 23/00     (2006.01)

(52) U.S. Cl.
USPC ........................................................ 73/290 R

(58) Field of Classification Search
USPC ............... 73/321, 1.73, 1.31, 1.33, 290 V
See application file for complete search history.

(56) References Cited

U.S. PATENT DOCUMENTS

| | | | | |
|---|---|---|---|---|
| 4,000,650 A * | 1/1977 | Snyder | ............ | 73/290 V |
| 4,130,018 A * | 12/1978 | Adams et al. | ............ | 73/290 V |
| 5,136,299 A * | 8/1992 | Edvardsson | ............ | 342/124 |
| 5,406,842 A | 4/1995 | Locke | | |
| 5,442,359 A | 8/1995 | Rubin | | |
| 5,773,913 A * | 6/1998 | Casselden | ............ | 310/338 |
| 5,774,089 A | 6/1998 | Bamler et al. | | |
| 6,314,055 B1 * | 11/2001 | Foxlin et al. | ............ | 367/127 |
| 6,629,458 B1 | 10/2003 | Westerling et al. | | |
| 7,681,464 B2 * | 3/2010 | Doh et al. | ............ | 73/862.391 |
| 2002/0100317 A1 * | 8/2002 | Deserno et al. | ............ | 73/290 V |
| 2003/0167839 A1 | 9/2003 | Burger et al. | | |
| 2004/0196177 A1 | 10/2004 | Billington et al. | | |
| 2005/0190098 A1 | 9/2005 | Bridgelall et al. | | |
| 2007/0209434 A1 * | 9/2007 | Peters | ............ | 73/290 V |

FOREIGN PATENT DOCUMENTS

| | | |
|---|---|---|
| DE | 100 40 180 A1 | 4/2002 |
| JP | 58-47219 | 3/1983 |
| JP | 60-73311 | 4/1985 |
| JP | 2-236421 | 9/1990 |
| NL | 1032192 | 7/2006 |

(Continued)

OTHER PUBLICATIONS

English translation of Motoyasu [58047219].*

(Continued)

*Primary Examiner* — Hezron E Williams
*Assistant Examiner* — Jamar Ray

(57) ABSTRACT

A method includes lowering a sensor unit in a tank, where the tank is capable of receiving a material. The method also includes determining a first distance between the material and the sensor unit and determining a second distance between the sensor unit and a main unit that lowers the sensor unit. In addition, the method includes determining a level of the material in the tank using the first and second distances. The method could further include calibrating the sensor unit to compensate for variations in a medium within the tank, where the sensor unit transmits wireless signals through the medium to determine the first distance. Determining the first distance could include using an ultrasonic measurement technique, and determining the second distance could include using a non-contact servo measurement technique.

22 Claims, 5 Drawing Sheets

(56) References Cited

FOREIGN PATENT DOCUMENTS

| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/064421 A1 | 6/2008 |

OTHER PUBLICATIONS

International Standard, Petroleum and liquid petroleum products-Measurement of level and temperature in storage tanks by automatic methods, Part 3: Measurement of level in pressurized storage tanks (non-refrigerated), 1st Edition, Nov. 15, 2002, 21 pages.

"Servo Gauge 854ATG" Product Sheet, Enraf B.V., 4 pages, 2008.

"Level sensor", wikipedia.org, Aug. 2, 2008, 8 pages.

"HERMetic Sensor", Honeywell Enraf, 5 pages, 2007.

Bin Sai, "Method and Apparatus for Real-Time Calibration of a Liquid Storage Tank Level Gauge", U.S. Appl. No. 12/119,957, filed May 13, 2008.

\* cited by examiner

APPARATUS AND METHOD FOR MONITORING TANKS IN AN INVENTORY MANAGEMENT SYSTEM

CROSS-REFERENCE TO RELATED APPLICATIONS

This application claims priority under 35 U.S.C. §119(e) to U.S. Provisional Patent Application No. 61/088,226 filed on Aug. 12, 2008, which is hereby incorporated by reference.

TECHNICAL FIELD

This disclosure relates generally to inventory management systems and more specifically to an apparatus and method for monitoring tanks in an inventory management system.

BACKGROUND

Processing facilities and other facilities routinely include tanks for storing liquid materials and other materials. For example, storage tanks are routinely used in tank farm facilities and other storage facilities to store oil or other materials. As another example, oil tankers and other liquid transport vessels routinely include numerous tanks storing oil or other materials.

When a tank is being filled, "topping off" typically refers to the period of time when the tank is being filled to its final or highest point. During this time, the tank typically reaches the stage where it is considered "full." Topping off could refer, for example, to filling the last one or two meters of the tank.

Accurate topping off has become more important in recent years for various reasons. For example, accurate topping off is often needed to optimize the loading efficiency in tankers, tank farms, and other environments where oil or other materials are stored. Accurate topping off is also often important for onboard operational safety and stability in tankers and other vessels. Measurements related to topping off are often performed by operators or other personnel using handheld gauging equipment. The gauging equipment is manually controlled and adjusted. The use of handheld gauging equipment often requires intense concentration by the personnel, which is often difficult especially in environments where the loading of tanks can take several hours.

SUMMARY

This disclosure provides an apparatus and method for monitoring tanks in an inventory management system.

In a first embodiment, a method includes lowering a sensor unit in a tank, where the tank is capable of receiving a material. The method also includes determining a first distance between the material and the sensor unit and determining a second distance between the sensor unit and a main unit that lowers the sensor unit. The method further includes determining a level of the material in the tank using the first and second distances.

In particular embodiments, the method also includes calibrating the sensor unit to compensate for variations in a medium within the tank. The sensor unit transmits wireless signals through the medium to determine the first distance.

In other particular embodiments, the method also includes determining the first distance between the material and the sensor unit multiple times. The method further includes calibrating the sensor unit for each determination of the first distance.

In a second embodiment, an apparatus includes a sensor unit configured to be raised and lowered in a tank capable of receiving a material. The sensor unit is also configured to generate wireless signals for determining a first distance between the material and the sensor unit. The apparatus also includes a main unit configured to raise and lower the sensor unit and to determine a second distance between the sensor unit and the main unit.

In a third embodiment, a system includes a sensor unit configured to be raised and lowered in a tank capable of receiving a material. The sensor unit is also configured to generate wireless signals for determining a first distance between the material and the sensor unit. The system also includes a main unit configured to raise and lower the sensor unit, determine a second distance between the sensor unit and the main unit, and determine a level of the material in the tank using the first and second distances. The system further includes a connection physically coupling the sensor unit to the main unit. In addition, the system includes a communication unit configured to communicate with the main unit and to communicate over a communication link.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
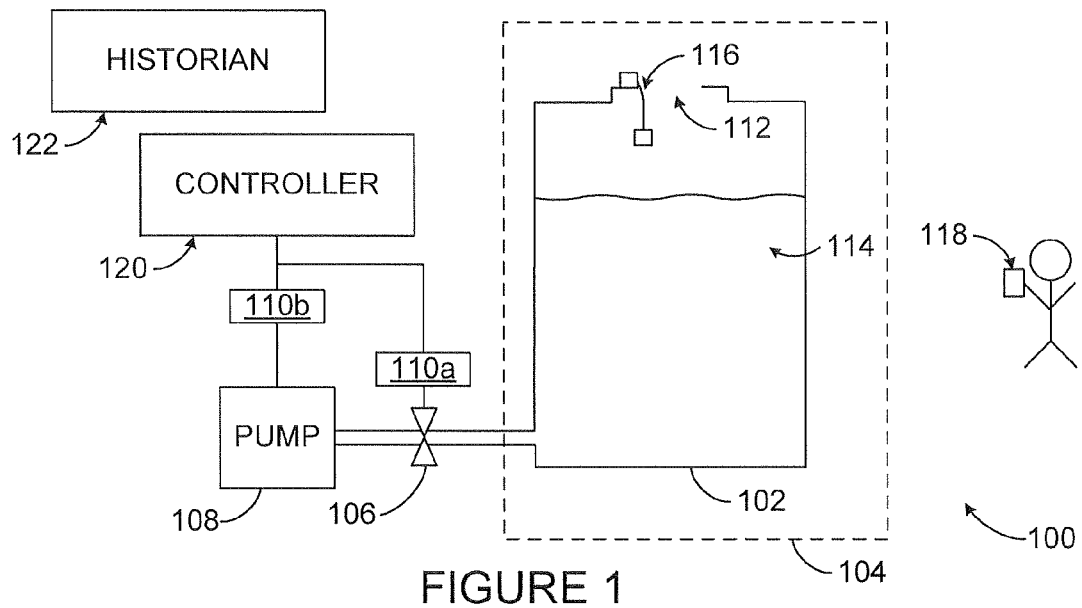
FIG. 1 illustrates an example inventory management system according to this disclosure.

FIG. 1 illustrates an example inventory management system 100 according to this disclosure. The embodiment of the inventory management system 100 shown in FIG. 1 is for illustration only. Other embodiments of the inventory management system 100 could be used without departing from the scope of this disclosure.

As shown in FIG. 1, the inventory management system 100 includes at least one tank 102. The tank 102 generally represents any suitable structure for receiving and storing at least one liquid or other material. The tank 102 could, for example, represent an oil storage tank or a tank for storing other liquid or other material(s). Also, the tank 102 could have any suitable shape and size. Further, the tank 102 could form part of a larger structure 104. The larger structure 104 could represent any fixed or movable structure containing or associated with one or more tanks 102, such as a movable tanker vessel, railcar, or truck or a fixed tank farm.

In this example, at least one valve 106 controls the flow of material into or out of the tank 102. Also, a pump 108 is used to pump material into or out of the tank 102 through the valve 106. The valve 106 may be associated with a valve actuator 110, which can open and close the valve 106 to adjust the flow of material into or out of the tank 102. Similarly, the pump 108 may be associated with a pump actuator 110, which can control the operation of the pump 108 to adjust the flow of material into or out of the tank 102. While the valve 106 and pump 108 are shown here as filling the tank 102 from the bottom, the tank 102 can be filled in any suitable manner and in any suitable location. Moreover, the valve 106 and pump 108 can be used in conjunction with one or multiple tanks 102. For example, if used to fill multiple tanks 102, the valve 106 and pump 108 can be selectively coupled to one or more of the tanks 102 being filled, and once filled the valve 106 and pump 108 can be decoupled from those tanks and coupled to one or more other tanks 102.

As shown in FIG. 1, the tank 102 includes an opening 112 along its top or upper surface. The opening 112 could represent any suitable opening or other structure providing access to the interior of the tank 102. The opening 112 could also represent a structure that can be selectively opened and closed to provide temporary access to the tank 102. As particular examples, the opening 112 could represent a hatch or a valve.

In this example embodiment, the height or level of a material 114 in the tank 102 can be monitored by a tank monitoring system 116. The tank monitoring system 116 represents a device or system that can measure the level of material 114 in the tank 102 with high accuracy. The tank monitoring system 116 could, for example, continuously and automatically measure the level of material 114 in the tank 102 during a topping-off procedure. In this way, the tank monitoring system 116 can constantly monitor the level of material 114 in the tank 102, such as over the last few meters close to the final maximum filling level of the tank 102. Note here that the term "level" could refer to the absolute level of the material 114 in the tank 102, such as when the level represents the distance between the top of the material 114 and the bottom of the tank 102 (and the total height of the tank 102 is known). The term "level" could also refer to the relative level of the material 114 in the tank 102, such as when the level represents the distance between the top of the material 114 and the top of the tank 102.

The level measurements generated by the tank monitoring system 116 could be used in any suitable manner. For example, the level measurements could be provided to a human operator, such as via a display on the tank monitoring system 116 or a portable or other user device 118 (like a mobile telephone, personal digital assistant, or other device) used by the operator. The human operator could use these measurements in any suitable manner, such as to monitor the level and control the flow of material 114 into the tank 102. The level measurements could also be provided to a controller 120, which could control the valve 106 or pump 108 via the actuator 110a or 110b to control the flow of material 114 into the tank 102. The level measurements could further be provided to a historian 122, which could record the measurements for historical or other purposes.

As a particular example, during loading of tanks 102 on a vessel, a topping off procedure generally involves loading the material 114 into tanks 102 at a slower rate, which occurs when the tanks 102 are "almost full." During this procedure, any number of tanks (such as two, four, or six) could be loaded at the same time, and the topping off procedure generally involves personnel both on the vessel and on shore performing certain functions. Measurements from the tank monitoring system 116 could be provided to any of these personnel to support the successful completion of the topping off procedure.

The measurements from the tank monitoring system 116 may be more accurate than conventional level sensors. For example, radar-based systems are often unsuitable for use during topping off when the material level is close to the radar antenna. Manual gauges often require operator attention over a long period of time and may not be particularly accurate. With the tank monitoring system 116, multiple measurement techniques (such as modified servo and ultrasonic measurement techniques) can be combined to provide accurate measurements of the level of material 114 in the tank 102.

In some embodiments, the tank monitoring system 116 represents a portable device or system that can be moved from one tank 102 to another tank 102 by an operator or other personnel. Also, in some embodiments, the tank monitoring system 116 can be used to support topping-off, monitoring, and measuring functionalities. In addition, the tank monitoring system 116 could integrate multiple measurement techniques along with auto-calibration, power management, and wired or wireless communications. This could allow the tank monitoring system 116 to achieve high precision, low power consumption, and real-time monitoring and dispatching.

The tank monitoring system 116 includes any suitable structure(s) for determining the level of material in a tank. Details of example embodiments of the tank monitoring system 116 are shown in FIGS. 2 through 8, which are described below.

Although FIG. 1 illustrates one example of an inventory management system 100, various changes may be made to FIG. 1. For example, a system could include any number of tanks, valves, pumps, tank monitoring systems, actuators, controllers, historians, and user devices. Also, the makeup and arrangement of the inventory management system 100 are for illustration only. Components could be added, omitted, combined, subdivided, or placed in any other suitable configuration according to particular needs. In addition, FIG. 1 illustrates one operational environment in which tank monitoring functionality can be used. This functionality could be used in any other suitable system.

Figure 2:
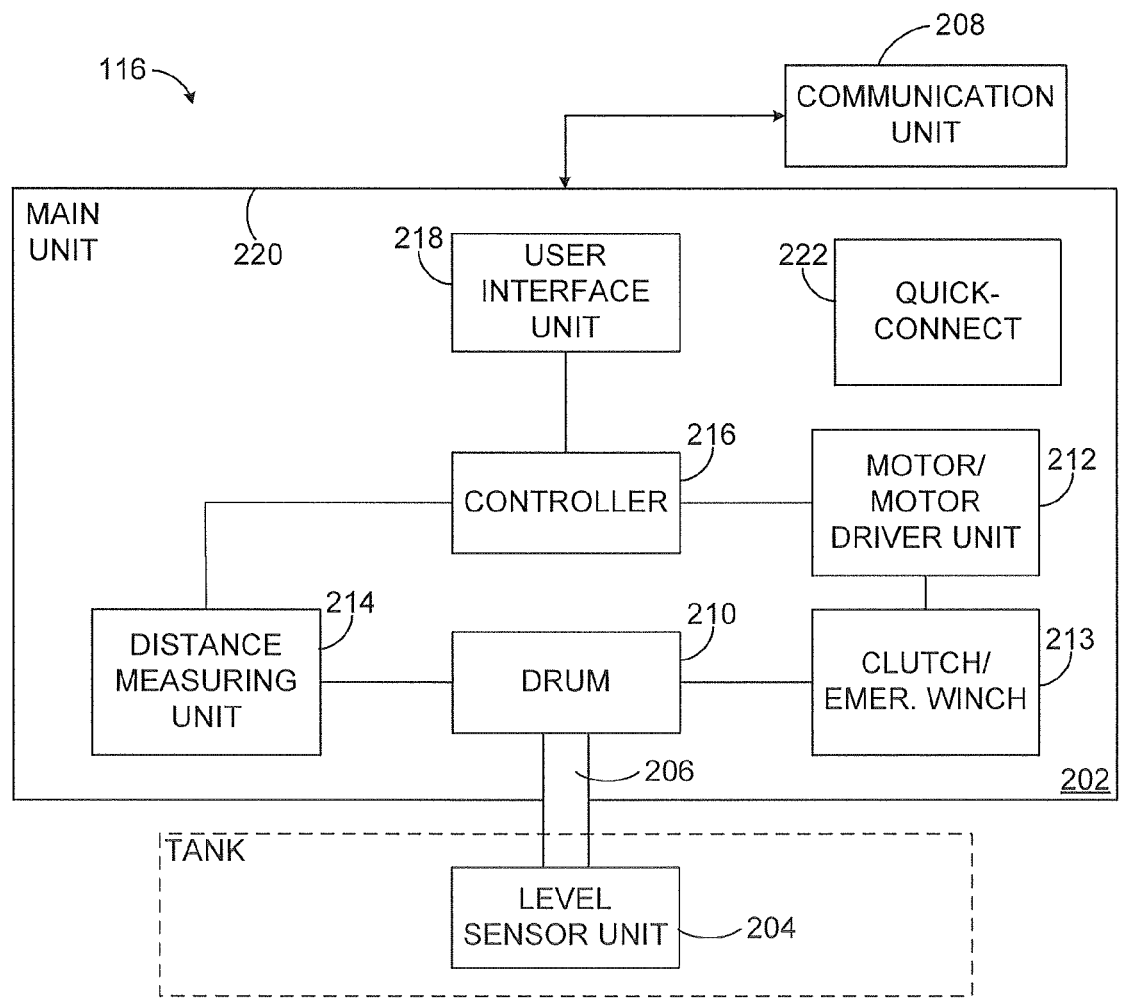
FIG. 2 illustrates an example tank monitoring system according to this disclosure.

FIG. 2 illustrates an example tank monitoring system 116 according to this disclosure. The embodiment of the tank monitoring system 116 shown in FIG. 2 is for illustration only. Other embodiments of the tank monitoring system 116 could be used without departing from the scope of this disclosure. Also, for ease of explanation, the tank monitoring system 116 is described as being used with the tank 102 in the system 100 of FIG. 1, although the tank monitoring system 116 could be used in any other suitable environment.

In this example, the tank monitoring system 116 includes a main unit 202, a sensor unit 204, a tape 206, and a communication unit 208. In general, the main unit 202 can be placed at or near the opening 112 of a tank 102, and the main unit 202 can raise and lower the sensor unit 204 within the tank 102 using the tape 206. The main unit 202 can also perform calculations to determine the level of material 114 in the tank 102. For example, the main unit 202 can measure the distance of the sensor unit 204 from the main unit 202, such as by using a modified servo measurement technique (based on an amount of tape 206 dispensed to lower the sensor unit 204). The main unit 202 can add that distance to a distance of the sensor unit 204 from the material 114 (as measured by the sensor unit 204, such as by using an ultrasonic measurement technique). The servo technique is referred to as "modified" since servo measurements are typically "contact" measurements, meaning servo devices typically require physical contact with the material being measured. In this embodiment, however, the servo measurement technique is non-contact since the sensor unit 204 does not physically contact with the material 114 being measured in the tank 102. In this way, the main unit 202 can identify the distance between the main unit 202 and the material 114 in the tank 102.

The sensor unit 204 is raised and lowered in a tank 102 and can measure the distance between the sensor unit 204 and material 114 in the tank 102. For example, the sensor unit 204 could take ultrasonic measurements of that distance, which could have high accuracy (such as ±1 mm). The measured distance can be provided to the main unit 202, such as via a wired communication link in the tape 206. The main unit 202 can use this distance to calculate the level of material 114 in the tank 102. The determined level could, for example, represent the amount of space remaining between the top of the tank 102 and the top of the material 114.

The tape 206 represents any suitable connection between the main unit 202 and the sensor unit 204. For example, the tape 206 could represent a thin flat piece of metal or plastic having a narrow width. The tape 206 could also include power supply lines for providing power to the sensor unit 204 from the main unit 202 and communication lines for enabling communications between the sensor unit 204 and the main unit 202. The tape 206 could have any suitable size and shape and be formed from any suitable material(s). The tape 206 could also have distance information printed or coded onto the tape itself. This information could be used by the main unit 202 to measure the amount of tape 206 dispensed, which could allow the main unit 202 to identify the distance between the main unit 202 and the sensor unit 204. The printing or coding could also allow an operator to view the amount of tape 206 that has been dispensed by the main unit 202.

The communication unit 208 facilitates the communication of data to or from the main unit 202. For example, the communication unit 208 could receive level measurements calculated by the main unit 202 and transmit the level measurements to one or more external destinations (such as the user device 118, controller 120, or historian 122). The communication unit 208 could support any suitable wired or wireless communications. The communication unit 208 includes any suitable structure supporting wired or wireless communications. When wired communications are used, the communication unit 208 could include an Ethernet connection or other wired interface. When wireless communications are used, the communication unit 208 could include a radio frequency (RF) or other wireless transceiver.

In this example, the main unit 202 includes a drum 210. The tape 206 can be wrapped or wound around the drum 210, and the drum 210 can be rotated to raise and lower the sensor unit 204. For example, the drum 210 could be rotated in one direction to lower the sensor unit 204 and rotated in the other direction to raise the sensor unit 204. The drum 210 includes any suitable structure for raising and lowering the sensor unit 204 by dispensing and collecting the tape 206, such as a cylindrical-shaped object.

The drum 210 is controlled by a motor and motor driver unit 212. The motor of the unit 212 represents any suitable structure for rotating the drum 210, such as a bi-directional motor. The motor driver of the unit 212 controls the operation of the motor, such as by using external control signals to control the motor's direction of rotation. The motor driver of the unit 212 represents any suitable structure for controlling the operation of a motor. Also, a clutch and emergency winch 213 can also be coupled to the drum 210. The clutch and emergency winch 213 can be used to manually raise the sensor unit 204. This may allow, for example, an operator to manually raise the sensor unit 204 when the main unit 202 is malfunctioning (such as when the main unit 202 has a defective battery or defective electronics). The clutch and emergency winch 213 includes any suitable structure for manually rotating the drum 210.

A distance measuring unit 214 measures a distance between the main unit 202 and the sensor unit 204. The distance measuring unit 214 can also report the measured distance for use in determining the level of material 114 in a tank 102. The distance measuring unit 214 could use any suitable technique to measure the distance between the main unit 202 and the sensor unit 204. For example, the distance measuring unit 214 could use the amount or length of tape 206 dispensed from the drum 210 and the angle of the tape 206 with respect to the drum 210 to determine this distance. In some embodiments, the main unit 202 moves the sensor unit 204 using one or more specified step sizes, meaning a specified amount of tape 206 is released or reeled in each time the sensor unit 204 is moved. In these embodiments, the amount of tape 206 currently unwound from the drum 210 may be known based on the step size and number of moves, and the angle of the tape 206 with respect to the drum 210 can be measured and used (along with the known tape length) to calculate the distance between the main unit 202 and the sensor unit 204. The distance measuring unit 214 includes any suitable structure for determining a distance between two components, such as an absolute angle detector or a tape reader.

A controller 216 controls the overall operation of the main unit 202. For example, the controller 216 could control the operation of the motor driver in the unit 212 to thereby control the operation of the motor in the unit 212 and the rotation of the drum 210. This allows the controller 216 to control the raising and lowering of the sensor unit 204 in the tank 102. The controller 216 could also receive measurements from the distance measuring unit 214, where those measurements identify distances between the main unit 202 and the sensor unit 204. The controller 216 could combine these measurements with ultrasonic or other measurements from the sensor unit 204 to identify the total distance between the main unit 202 and the material 114 in the tank 102. The controller 216 can further communicate measurement data or other data to an external source and receive user commands or other data via the communication unit 208. The controller 216 includes any suitable processing or computing device, such as a processor, microprocessor, microcontroller, field programmable gate array, or digital signal processor.

A user interface unit 218 facilitates communication between the controller 216 and an operator or other personnel. The user interface unit 218 could, for example, provide data to the controller 216 from the operator, such as a command to initiate level measurements or a command to raise or lower the sensor unit 204. The user interface unit 218 could also allow the personnel to review measurement data received or generated by the controller 216. The user interface unit 218 includes any suitable interface for interacting with one or more users, such as a keypad or keyboard and a display.

In addition, the main unit 202 includes a housing 220 and a quick-connect 222. The housing 220 generally represents any suitable structure encasing, containing, holding, or otherwise supporting the other components of the main unit 202. Although shown as being separate, the communication unit 208 could also reside or be supported by the housing 220. The quick-connect 222 represents any suitable structure for connecting the housing 220 to a penetration point of a tank 102, such as at the opening 112 of the tank 102. The quick-connect 222 allows an operator or other personnel to connect the main unit 202 to a tank 102 and later disconnect the main unit 202 from the tank 102. The quick-connect 222 could use any suitable technique to be connected to a tank. Note, however, than the main unit 202 could also be permanently connected to a tank or other structure.

Although FIG. 2 illustrates one example of a tank monitoring system 116, various changes may be made to FIG. 2. For example, the sensor unit 204 could be raised and lowered in any other suitable manner. Also, the functional division shown in FIG. 2 is for illustration only. Various components could be combined, subdivided, or omitted and additional components could be added according to particular needs. In addition, functions described as being performed by one component of the tank monitoring system 116 could be performed by any other suitable component(s) of the tank monitoring system 116.

Figure 3:
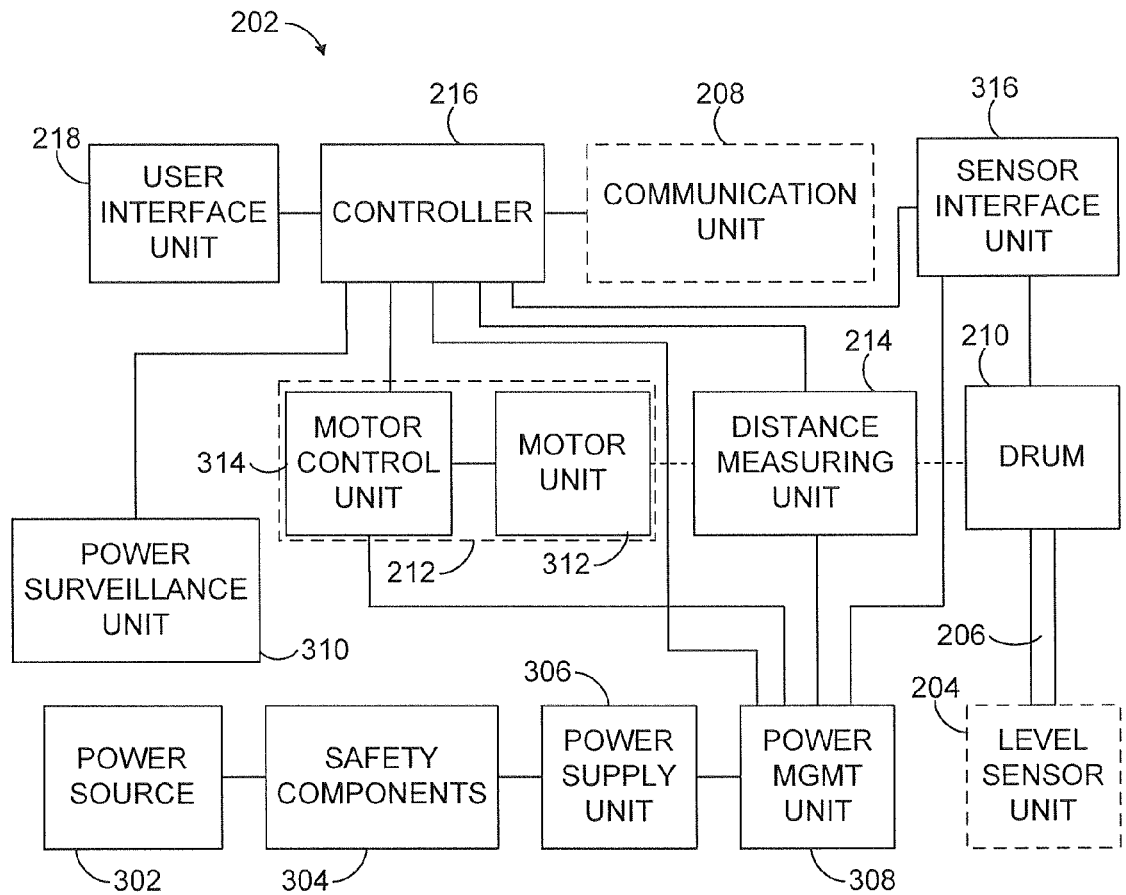
FIG. 3 illustrates additional details of an example main unit in a tank monitoring system according to this disclosure.

FIG. 3 illustrates additional details of an example main unit 202 in a tank monitoring system 116 according to this disclosure. The embodiment of the main unit 202 shown in FIG. 3 is for illustration only. Other embodiments of the main unit 202 could be used without departing from the scope of this disclosure. Also, for ease of explanation, the main unit 202 is described as being used with the tank 102 in the system 100 of FIG. 1, although the main unit 202 could be used in any other suitable environment.

In this example, the main unit 202 includes a local power source 302. The power source 302 provides a voltage used to supply power to various components of the main unit 202, such as the motor, controller, and distance measuring unit. The power source 302 represents any suitable source of power, such as a battery, fuel cell, or solar cell.

The power source 302 is coupled to safety components 304, which help to ensure that the main unit 202 meets any safety provisions imposed on use of the main unit 202. For example, the safety components 304 could help to protect against sparks, shorts, or other problems, which could be dangerous or hazardous (such as when the main unit 202 is used with a petroleum storage tank). A power supply unit 306 receives the voltage from the power source 302 and generates one or more suitable voltages for use by other components in the main unit 202. The power supply unit 306 could, for example, receive a voltage at one level and generate one or more voltages at different levels. The power supply unit 306 includes any suitable structure for generating one or more operating voltages, such as one or more voltage regulators.

A power management unit 308 controls the supply of power to other components of the main unit 202. For example, the power management unit 308 could control the supply of power to the controller 216 and other components. The power management unit 308 could also prevent power from being supplied to various components of the main unit 202 at appropriate times. The power management unit 308 includes any suitable structure for managing or controlling the supply of power.

A power surveillance unit 310 monitors an amount of power provided by the power source 302. For example, the power surveillance unit 310 could monitor the voltage level of a voltage provided by one or more batteries. The power surveillance unit 310 could signal the controller 216 if a problem is detected, such as when the monitored voltage level falls below a threshold level. The power surveillance unit 310 includes any suitable structure for monitoring the power provided by one or more power sources.

In this example, the motor and motor driver unit 212 includes a motor unit 312 and a motor control unit 314. The motor unit 312 represents the actual motor for rotating the drum 210, and the motor control unit 314 includes the driver and other components for controlling the operation of the motor unit 312.

A sensor interface unit 316 acts as an interface between the main unit 202 and the tape 206, which is coupled to the sensor unit 204. The sensor interface unit 316 therefore supports interaction between the controller 216 and the sensor unit 204. For example, the sensor interface unit 316 could receive a voltage from the power management unit 308 and provide the voltage to the sensor unit 204. In this way, the sensor interface unit 316 helps to provide operating power to the sensor unit 204. The sensor interface unit 316 could also provide data from the controller 216 to the sensor unit 204 and provide data from the sensor unit 204 to the controller 216. The sensor interface unit 316 includes any suitable structure providing for the exchange of data, power, or other signals between the main unit 202 and the sensor unit 204.

Although FIG. 3 illustrates additional details of one example of a main unit 202 in a tank monitoring system 116, various changes may be made to FIG. 3. For example, the functional division shown in FIG. 3 is for illustration only. Various components could be combined, subdivided, or omitted and additional components could be added according to particular needs.

Figure 4:
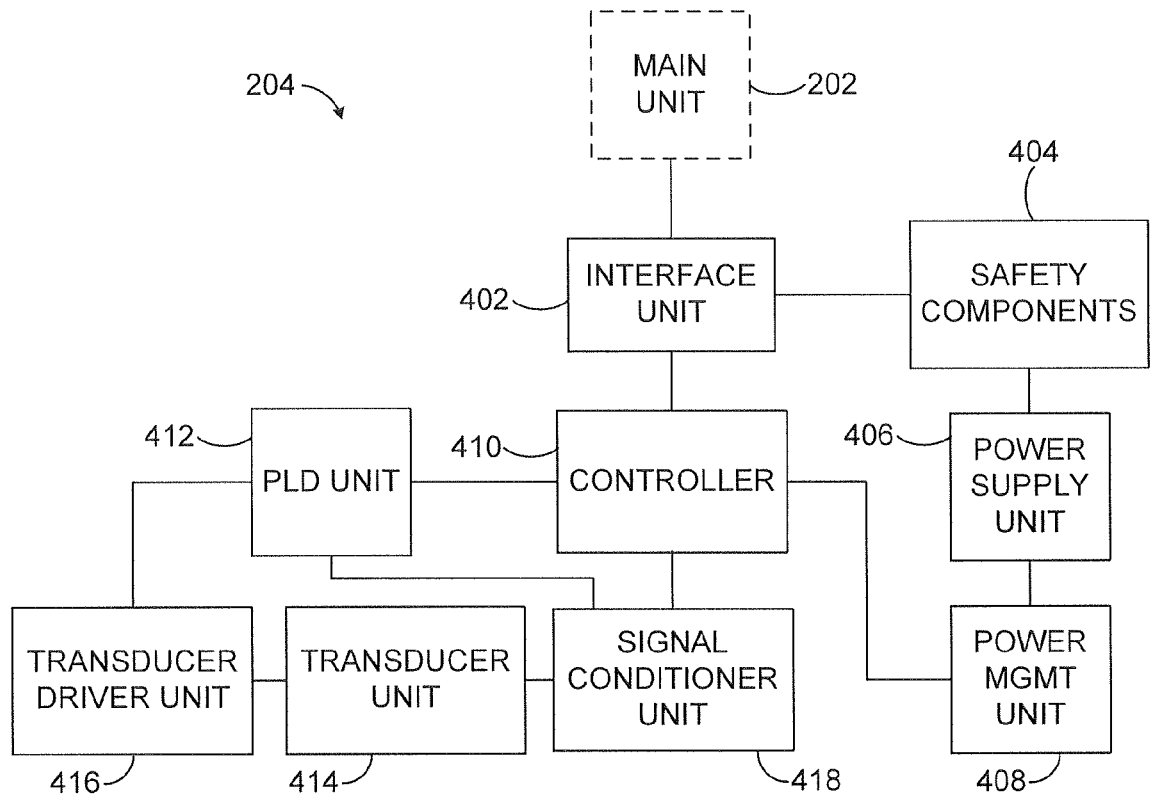
FIG. 4 illustrates an example sensor unit in a tank monitoring system according to this disclosure.

FIG. 4 illustrates an example sensor unit 204 in a tank monitoring system 116 according to this disclosure. The embodiment of the sensor unit 204 shown in FIG. 4 is for illustration only. Other embodiments of the sensor unit 204 could be used without departing from the scope of this disclosure. Also, for ease of explanation, the sensor unit 204 is described as being used with the tank 102 in the system 100 of FIG. 1, although the sensor unit 204 could be used in any other suitable environment.

As shown in FIG. 4, the sensor unit 204 includes an interface unit 402 acting as an interface between the sensor unit 204 and the tape 206, which is coupled to the main unit 202. For example, the interface unit 402 can receive power and data signals over the tape 206. The interface unit 402 can provide the power to safety components 404 and the data to a controller 410. The interface unit 402 can also transmit data from the controller 410 over the tape 206 to the main unit 202. The interface unit 402 includes any suitable structure providing for the exchange of data, power, or other signals between the sensor unit 204 and the main unit 202.

The safety components 404, power supply unit 406, and power management unit 408 could perform the same or similar functions as the corresponding components 304-308 in FIG. 3. In particular, these components 404-408 can receive a voltage from the interface unit 402, generate one or more operating voltages, and provide the operating voltages to other components of the sensor unit 204.

The controller 410 and a programmable logic device (PLD) unit 412 control the overall operation of the sensor unit 204. For example, the controller 410 and PLD unit 412 could provide power management functions (by controlling the power management unit 408), control the conditioning of ultrasonic or other received signals (by controlling a signal conditioner unit 418), and calibrate the operation of the sensor unit 204. The controller 410 and PLD unit 412 could also calculate distances between the sensor unit 204 and material 114 in a tank 102 and transmit data (such as the level measurements) to the main unit 202 via the interface unit 402. Depending on the implementation, each of these functions could involve one or both of the controller 410 and PLD unit 412. The controller 410 includes any suitable processing or computing device, such as a processor, microprocessor, microcontroller, field programmable gate array, or digital signal processor. The PLD unit 412 includes any suitable programmable logic device, such as a complex PLD.

Measurements of the distance between the sensor unit 204 and material 114 in a tank 102 occur using a transducer unit 414, a transducer driver unit 416, and a signal conditioner unit 418. The transducer unit 414 represents any suitable structure for transmitting and receiving wireless signals during level detection. The transducer unit 414 could, for example, generate and transmit ultrasonic signals, at least some of which reflect off material 114 in the tank 102. The reflected signals are received by the transducer unit 414 and provided to the signal conditioner unit 418. In some embodiments, the transducer unit 414 can measure distances of up to 300 mm with a resolution of ±1 mm. In particular embodiments, the transducer unit 414 includes a 200 kHz or 400 kHz pulse transformer or other suitable components.

The transducer driver unit 416 drives the transducer unit 414. For example, the transducer driver unit 416 can cause the transducer unit 414 to begin transmitting ultrasonic or other signals. The transducer driver unit 416 can also cause the transducer unit 414 to stop transmitting the ultrasonic or other signals so that the transducer unit 414 can receive signals reflected from material 114 in the tank 102. The transducer driver unit 416 includes any suitable structure for driving a transducer, such as an ultrasonic transducer driver.

The signal conditioner unit 418 receives signals reflected off material 114 in the tank 102 from the transducer unit 414. The signal conditioner unit 418 processes the received signals so that the distance between the sensor unit 204 and the material 114 in the tank 102 can be determined. For example, the signal conditioner unit 418 can filter and amplify the received signals. The signal conditioner unit 418 can also use an adjustable gain amplifier to adjust the received signals. A peak detector can be used to identify peaks in the received signals. Other operations can also be performed by the signal conditioner unit 418 so that the distance between the sensor unit 204 and material 114 in the tank 102 can be identified. The signal conditioner unit 418 includes any suitable structure(s) for conditioning or otherwise processing received signals. Additional details regarding the operation of the sensor unit 204 are provided below.

Although FIG. 4 illustrates one example of a sensor unit 204 in a tank monitoring system 116, various changes may be made to FIG. 4. For example, the functional division shown in FIG. 4 is for illustration only. Various components could be combined, subdivided, or omitted and additional components could be added according to particular needs.

Figure 5:
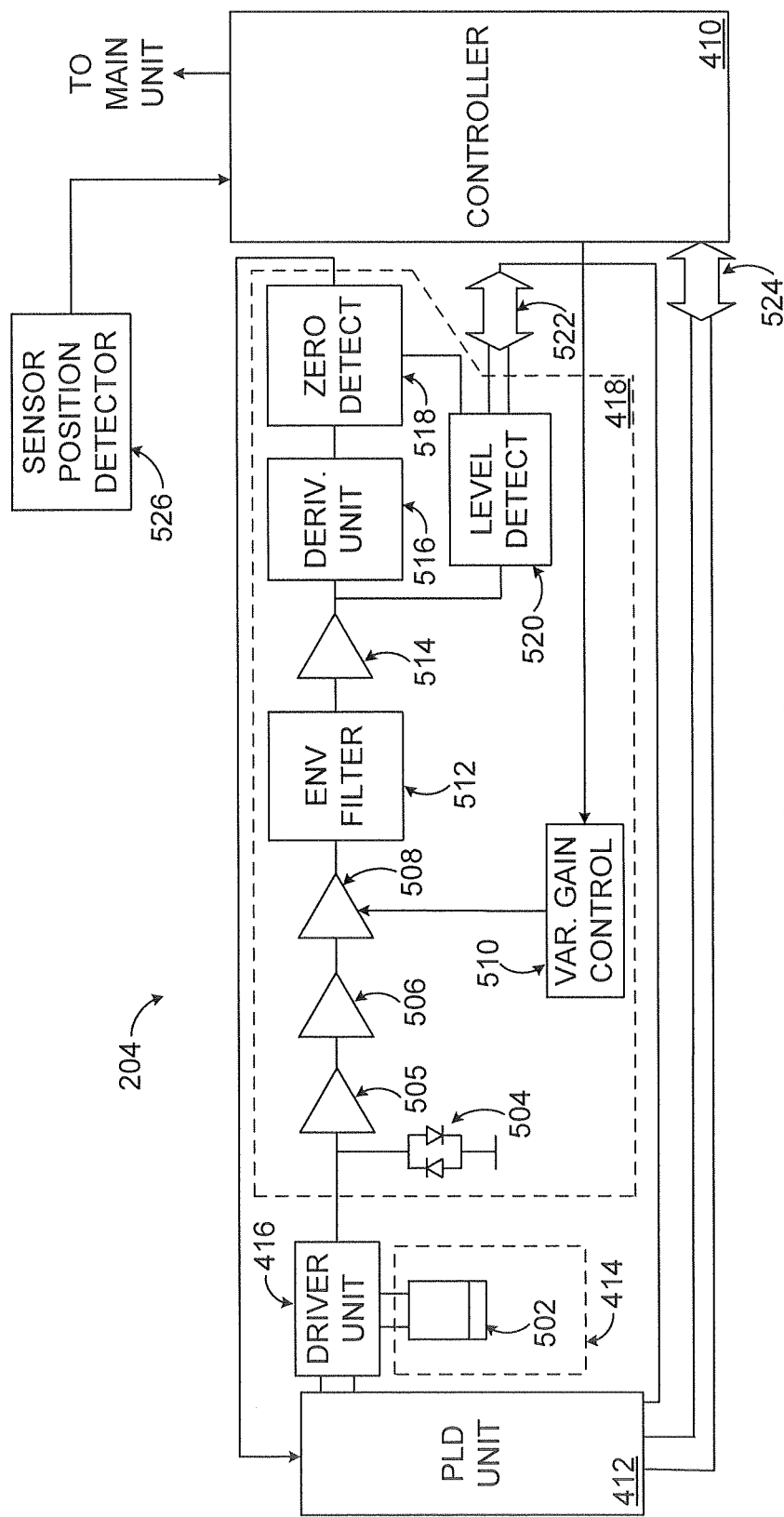
FIG. 5 illustrates additional details of an example sensor unit in a tank monitoring system according to this disclosure.

FIG. 5 illustrates additional details of an example sensor unit 204 in a tank monitoring system 116 according to this disclosure. The embodiment of the sensor unit 204 shown in FIG. 5 is for illustration only. Other embodiments of the sensor unit 204 could be used without departing from the scope of this disclosure. Also, for ease of explanation, the sensor unit 204 is described as being used with the tank 102 in the system 100 of FIG. 1, although the sensor unit 204 could be used in any other suitable environment.

In this example, the transducer driver unit 416 could represent a high voltage (HV) driver and is coupled to the transducer unit 414, which includes a transducer cell 502. The transducer cell 502 generates the ultrasonic or other signals for transmission and receives any reflected signals. The transducer cell 502 includes any suitable structure for generating ultrasonic or other wireless signals and receiving reflected ultrasonic or other wireless signals. The transducer cell 502 could also include a transmitter and a separate receiver. In this embodiment, the transducer driver unit 416 is controlled by the PLD unit 412, which could include a timing generator for controlling the driving of the transducer cell 502.

As shown in FIG. 5, the signal conditioner unit 418 includes two diodes 504 and an input amplifier 505. The two diodes 504 are coupled to an output of the driver unit 416 and to an input of the input amplifier 505. The input amplifier 505 amplifies signals from the driver unit 416, which represent signals received by the transducer cell 502. The input amplifier 505 includes any suitable structure for amplifying signals.

The signal conditioner unit 418 also includes a filter 506 and a variable gain amplifier 508. The filter 506 filters the received reflected signals to filter out unwanted frequencies in the signals. The filter 506 includes any suitable structure for filtering signals, such as a low-pass or band-pass filter. The variable gain amplifier 508 amplifies the filtered signals by an amount specified by a variable gain control unit 510. The variable gain amplifier 508 includes any suitable structure for amplifying signals. The variable gain control unit 510 includes any suitable structure for controlling an amplifier. Here, the variable gain control unit 510 controls the variable gain amplifier 508 based on signals received from the controller 410.

The amplified signals from the amplifier 508 are provided to an envelope filter 512, which filters the amplified signals based on the strength of the signals entering the envelope filter 512. The filtered signals are provided to a buffer 514, which buffers the signals to allow for additional processing. The envelope filter 512 includes any suitable structure for filtering a signal, and the buffer 514 includes any suitable structure for buffering a signal.

The buffered signals are provided to a derivative unit 516, which determines the derivative of the buffered signals. The output of the derivative unit 516 represents the rate of change in the buffered signals. The derivative unit 516 includes any suitable structure for identifying a rate of change of a signal. The derivative unit 516 could, for example, include an operational amplifier and a resistor coupling the output and the inverting input of the operational amplifier.

The output of the derivative unit 516 is provided to a zero detector 518, which detects when the rate of change of the buffered signals equals zero. The detected zero crossings can be provided to the PLD unit 412, which can use the zero crossings to start and stop a counter. As described below, this allows the controller 410 to identify a "flying time" of the wireless signals (the time between transmission of the wireless signals and reception of reflected wireless signals). Multiple consecutive zero crossings can also define a measuring window, which is provided to a level detector 520 along with the buffered signals. The zero detector 518 includes any suitable structure for identifying when a signal equals zero, such as a comparator.

The level detector 520 determines the maximum level or value of the buffered signals during the measuring window defined by the zero detector 518. Outputs from the level detector 520 are provided to the PLD unit 412 via a bidirectional communication bus 522, which can provide the data to the controller 410. The controller 410 can use this data to generate signals for the variable gain control unit 510 in order to adjust the variable gain amplifier 508. The level detector 520 includes any suitable structure for identifying a level of a signal during a specified time period.

The PLD unit 412 also provides outputs to the controller 410 via a bidirectional communication bus 524. These outputs from the PLD unit 412 include synchronized counter values. The counter values are synchronized with the driving of the transducer cell 502, and the PLD unit 412 can start and stop the counter based on the detected zero crossings. This allows the controller 410 to determine the time difference between when signals are transmitted from the sensor unit 204 and received at the sensor unit 204 (the "flying time"). The controller 410 can also determine the distance between the sensor unit 204 and the material 114 in a tank 102 based on the propagation speed of the wireless signals and the flying time of those wireless signals.

The sensor unit 204 further includes a sensor position detector 526, which performs various functions based on the position of the sensor unit 204. For example, the sensor position detector 526 could initiate a reset of the controller 410, such as when the sensor unit 204 is retracted back to the main unit 202. The sensor position detector 526 could also reduce a speed of the motor unit 312 in the main unit 202, such as when the sensor unit 204 is approaching a reset position. The sensor position detector 526 includes any suitable mechanism for performing control functions based on the position of the sensor unit 204.

Although FIG. 5 illustrates additional details of one example of a sensor unit 204 in a tank monitoring system 116, various changes may be made to FIG. 5. For example, the functional division shown in FIG. 5 is for illustration only. Various components could be combined, subdivided, or omitted and additional components could be added according to particular needs.

Figure 6A:
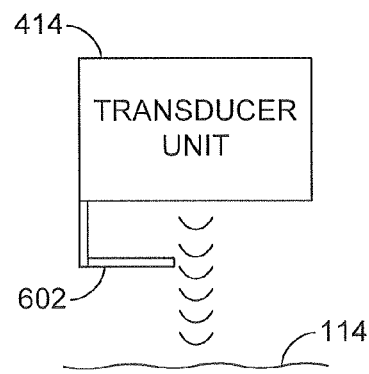
FIGS. 6A and 6B illustrate example calibration mechanisms for a sensor unit in a tank monitoring system according to this disclosure.
Figure 6B:
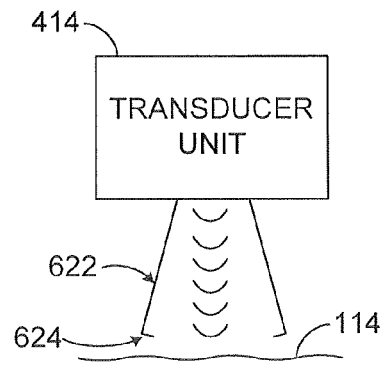

FIGS. 6A and 6B illustrate example calibration mechanisms for a sensor unit 204 in a tank monitoring system 116 according to this disclosure. The embodiments of the calibration mechanisms shown in FIGS. 6A and 6B are for illustration only. Other embodiments of the calibration mechanisms could be used without departing from the scope of this disclosure. Also, for ease of explanation, the calibration mechanisms are described as being used with the tank 102 in the system 100 of FIG. 1, although the calibration mechanisms could be used in any other suitable environment.

In FIG. 6A, the ultrasonic or other signals transmitted by the sensor unit 204 may vary in speed depending on the environment in which the sensor unit 204 is used. For example, the temperature, pressure, humidity, or composition of gas and/or vapor in a tank 102 around the sensor unit 204 may affect the propagation speed of ultrasonic waves through the medium. This change in speed can affect the calculations of the distance between the sensor unit 204 and material 114 in the tank 102.

To cope with uncertainties in ultrasonic or other measurements caused by changes in the properties of gas, vapor, or other medium, a reference finger 602 is used in conjunction with the transducer unit 414. The reference finger 602 is located at a known distance from the transducer unit 414, such as a known distance from a window (or emitting surface) through which ultrasonic or other waves pass.

Signals can be sent to and reflected from the reference finger 602 periodically or at other times. The known distance to the reference finger 602 can be used to determine the true or actual propagation speed of ultrasonic or other waves in the ambient environment. This speed can then be used to calibrate the sensor unit 204 so that the sensor unit 204 more accurately determines the position of material 114 in the tank 102 (according to time-of-flight in real-life conditions). In this way, ambient influences and effects can be taken into account so that more accurate distance measurements are obtained, even using an ultrasonic or other transducer that is vulnerable to environments with unknown and/or volatile properties. In particular embodiments, the sensor unit 204 could be calibrated for each measurement taken by the sensor unit 204. The reference finger 602 includes any suitable structure for reflecting ultrasonic or other waves.

Reference fingers can also be used in conjunction with other structures. For example, FIG. 6B illustrates a concentration and calibration mechanism that includes a concentrator 622 with one or more reference fingers 624. The concentrator 622 helps to focus or otherwise direct ultrasonic or other waves from the transducer unit 414 towards the material 114 in a tank 102. The concentrator 622 also helps to focus or otherwise direct ultrasonic or other waves reflected from the material 114 back to the transducer unit 414. The concentrator 622 includes any suitable structure that can focus ultrasonic or other waves, such as a partial conical structure. The concentrator 622 could also be formed from any suitable material(s).

The reference finger 624 is located at a known distance from the transducer unit 414, such as a known distance from a window through which ultrasonic or other waves pass. Signals sent to and reflected from the reference finger 624 can be used to determine the true or actual propagation speed of ultrasonic or other waves in the ambient environment, which can be used to calibrate the sensor unit 204.

Although FIGS. 6A and 6B illustrate examples of calibration mechanisms for a sensor unit 204 in a tank monitoring system 116, various changes may be made to FIGS. 6A and 6B. For example, the reference fingers 602 and 624 could be fixed in position or movable. Also, while a single reference finger 602 or 624 is shown here, multiple reference fingers (such as at multiple known distances) could be used. In addition, the flare angles of the concentrator 622, the angle of the reference finger 602, and the angle of the reference finger 624 can have any suitable values needed to obtain proper reference signals for calibration.

Figure 7:
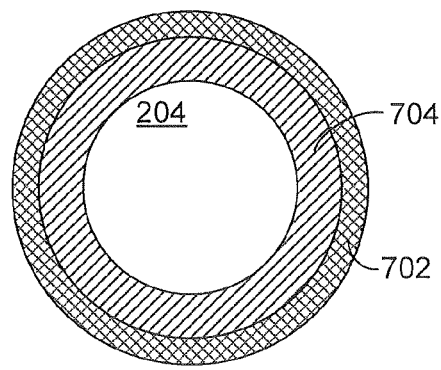
FIGS. 7 and 8 illustrate example arrangements of a sensor unit in a tank monitoring system according to this disclosure.
Figure 8:
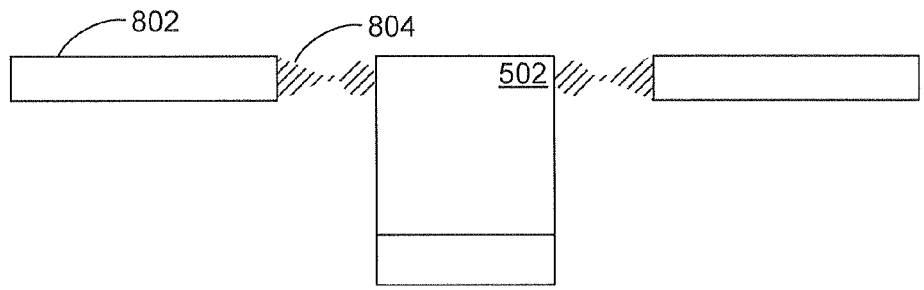

FIGS. 7 and 8 illustrate example arrangements of a sensor unit 204 in a tank monitoring system 116 according to this disclosure. The example arrangements of the sensor unit 204 shown in FIGS. 7 and 8 are for illustration only. Other arrangements of the sensor unit 204 could be used without departing from the scope of this disclosure. Also, for ease of explanation, the arrangements of the sensor unit 204 are described as being used with the tank 102 in the system 100 of FIG. 1, although the sensor unit 204 could be used in any other suitable environment.

As shown in FIG. 7, the sensor unit 204 in this example represents a circular component that is embedded within a housing 702. The housing 702 represents any suitable structure for holding the sensor unit 204, such as a housing that can be coupled to the tape 206 and raised and lowered by the main unit 202. A mount 704 holds the sensor unit 204 within the housing 702. The mount 704 could be formed from any suitable material(s), such as silicone, silicone foam, or fluorosilicone foam, resin, or gel.

As shown in FIG. 8, the transducer cell 502 of the sensor unit 204 in this example is mounted on a holder 802 by a gasket 804. The holder 802 represents any suitable structure for retaining the transducer cell 502, such as a metal ring or other solid structure. The gasket 804 represents any suitable structure for retaining the transducer cell 502 within the holder 802, such as a vulcanized rubber gasket or other elastomer gasket.

In either of these embodiments, the mount 704 or gasket 804 could help to reduce or prevent undesired signals from interfering with the operation of the sensor unit 204. For example, the mount 704 or gasket 804 could reduce or prevent resonances from forming and being received by the sensor unit 204.

Although FIGS. 7 and 8 illustrate examples of arrangements of a sensor unit 204 in a tank monitoring system 116, various changes may be made to FIGS. 7 and 8. For example, the sensor unit 204 could include any other suitable mechanism for mounting or holding a transducer or the sensor unit itself.

Figure 9:
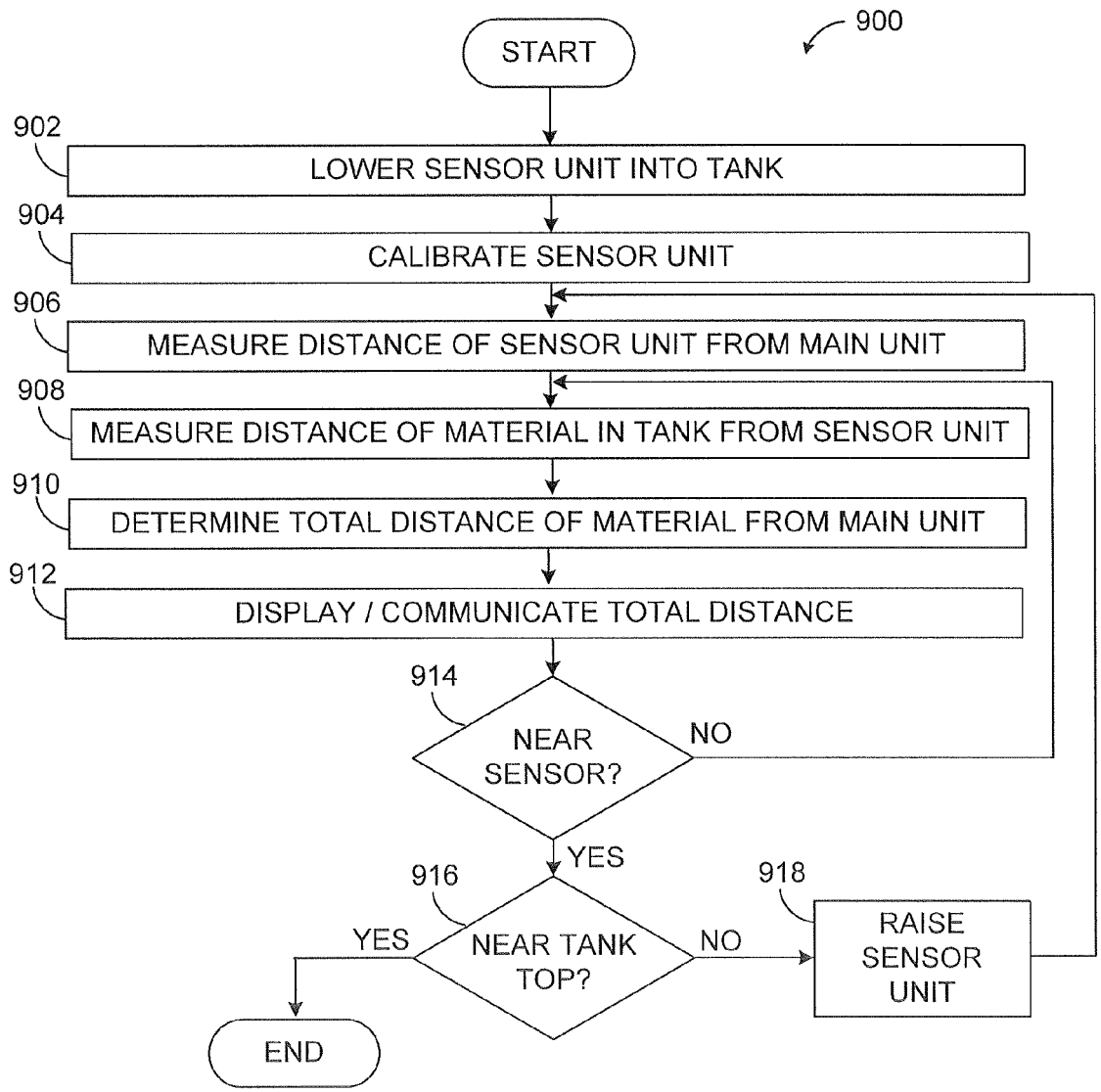
FIG. 9 illustrates an example method for monitoring tanks in an inventory management system according to this disclosure.

FIG. 9 illustrates an example method 900 for monitoring tanks in an inventory management system according to this disclosure. The embodiment of the method 900 shown in FIG. 9 is for illustration only. Other embodiments of the method 900 could be used without departing from the scope of this disclosure. Also, for ease of explanation, the method 900 is described as being used by the tank monitoring system 116 with the tank 102 in the system 100 of FIG. 1. The method 900 could be used with any other suitable device or system and in any other suitable environment.

A sensor unit is lowered into a tank to be monitored at step 902. This could include, for example, the main unit 202 lowering the sensor unit 204 into a tank 102 by dispensing an amount of tape 206 from the drum 210. The sensor unit 204 could be lowered in steps, where each step involves lowering the sensor unit 204 by a specified amount. The sensor unit is calibrated at step 904. This could include, for example, a transducer cell 502 in the sensor unit 204 generating ultrasonic signals that are reflected off a reference finger 602 at a known distance from the transducer cell 502. This may also include the sensor unit 204 receiving the reflected signals and determining a time-of-flight for the ultrasonic signals in the ambient environment within the tank 102.

A distance of the sensor unit from the main unit is measured at step 906. This may include, for example, the distance measuring unit 214 in the main unit 202 determining the distance based on the amount of tape 206 dispensed and the angle of the tape 206 with respect to the drum 210. A distance of the sensor unit from material in the tank is measured at step 908. This may include, for example, the transducer unit 414 transmitting ultrasonic signals and receiving reflected signals. This may also include the signal conditioner unit 418 conditioning the received signals and the controller 410/PLD unit 412 determining the distance. A total distance of the material from the main unit is determined at step 910. This could include, for example, the controller 410 reporting, to the main unit 202 through the tape 206, the distance of the sensor unit 204 from the material 114. This may also include the controller 216 combining measurements from the distance measuring unit 214 and measurements from the sensor unit 204 to produce the total distance. The total distance is displayed or communicated at step 912. This could include, for example, the controller 216 providing the total distance to the communication unit 208 for transmission to one or more destinations. This could also include the main unit 202 displaying the total distance to an operator.

A determination is made whether the material in the tank is nearing the sensor unit at step 914. This could include, for example, the controller 216 in the main unit 202 determining if the measured distance between the sensor unit 204 and the material 114 is less than a threshold distance. If not, the method 900 returns to step 908 to continue measuring the distance of the material 114 from the sensor unit 204.

If so, this means that the material in the tank may be coming too close to the sensor unit, and a determination is made whether the sensor unit is near a top of the tank being monitored at step 916. This could include, for example, the main unit 202 determining whether the sensor unit 204 has been raised as much as possible. If not near the top, the sensor unit is raised at step 918. This could include, for example, the main unit 202 raising the sensor unit 204 by reeling in an amount of tape 206 using the drum 210. The sensor unit 204 could be raised in steps, and this step could involve raising the sensor unit 204 by a specified amount. At this point, the method 900 returns to step 906 so that both distances can be computed. Otherwise, if the sensor unit is near the top of the tank, the method 900 ends. At this point, the tank has been filled. The tank monitoring system 116 could be removed and taken to another tank where the process can be repeated.

Although FIG. 9 illustrates one example of a method 900 for monitoring tanks in an inventory management system, various changes may be made to FIG. 9. For example, while shown as a series of steps, various steps in FIG. 9 could overlap, occur in parallel, occur in a different order, or occur multiple times. As a particular example, the sensor unit could be calibrated at various times when in use, such as for each measurement taken by the sensor unit. Also, while the main unit 202 is shown as calculating its distance from the sensor unit 204 once each time the sensor unit 204 is moved, both distances could be calculated at any suitable interval. In addition, the tank monitoring system 116 could perform any suitable function(s) when the material in a tank has reached one or more specified levels. For instance, an operator could use the interface unit 218 to specify one or more material levels, and the tank monitoring system 116 could generate an audible warning signal when the material reaches each of the material levels.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    lowering a sensor unit in a tank, the tank capable of receiving a material;
    transmitting wireless signals using the sensor unit;
    compensating for variations in a medium within the tank using wireless signals that are reflected by a reference finger, the reference finger disposed at a known distance from an emitting surface of the sensor unit;
    determining a first distance between the material and the sensor unit using wireless signals that are reflected off the material;
    determining a second distance between the sensor unit and a main unit that lowers the sensor unit;
    determining a level of the material in the tank using the first and second distances; determining, by the sensor unit, the level of the material in the tank as the tank is filled;
    raising, by the main unit, the sensor unit as the tank is filled; and
    adjusting a rate of adding the material to the tank based on the level of the material in the tank;
    wherein determining the first distance comprises:
        filtering electrical signals representing the wireless signals reflected off the material using a filter;
        amplifying an output of the filter using an amplifier;
        filtering an output of the amplifier based on a strength of the output of the amplifier using an envelope filter;
        buffering an output of the envelope filter using a buffer;
        determining a derivative of an output of the buffer;
        detecting zero crossings in the output of the buffer using the derivative of the output, the zero crossings detected using a zero-crossing detector, wherein consecutive zero crossings define a measuring window;
        generating a count value using a counter, wherein starting and stopping of the counter is based on the zero crossings;
        determining a time difference between when the wireless signals are transmitted and received using the count value; and
        determining the distance between the sensor unit and the material based on the time difference.

2. The method of claim 1, further comprising:
    calibrating the sensor unit to compensate for the variations in the medium within the tank.

3. The method of claim 2, further comprising:
    determining the first distance between the material and the sensor unit multiple times; and
    calibrating the sensor unit for each determination of the first distance.

4. The method of claim 1, wherein determining the level of the material in the tank comprises adding the first and second distances to identify a total distance between the material and the main unit.

5. The method of claim 4, further comprising at least one of:
    displaying the total distance to an operator; and
    communicating the total distance to a destination.

6. The method of claim 1, wherein raising the sensor unit comprises:
    comparing the first distance to a threshold distance; and
    raising the sensor unit when the first distance is less than the threshold distance.

7. The method of claim 1, wherein:
    the sensor unit is raised and lowered in steps; and
    raising the sensor unit comprises raising the sensor unit one step.

8. The method of claim 1, wherein:
    determining the first distance comprises using an ultrasonic measurement technique; and
    determining the second distance comprises using a non-contact servo measurement technique.

9. The method of claim 1, further comprising:
    responsive to identifying that the sensor unit has been raised to a top of the tank, determining that the tank has been filled and reducing the rate of adding the material to the tank or stopping the adding of the material to the tank.

10. The method of claim 1, wherein the reference finger is one of a plurality of movable reference fingers on a concentrator configured to focus the transmitted wireless signals.

11. An apparatus comprising:
    a sensor unit configured to be raised and lowered in a tank capable of receiving a material, the sensor unit also configured to generate wireless signals for determining a first distance between the material and the sensor unit, the sensor unit further configured to determine the level of the material in the tank as the tank is filled, the sensor unit comprising a reference finger that is disposed at a known distance from an emitting surface of the sensor unit; and
    a main unit configured to lower the sensor unit into the tank, to raise the sensor unit as the tank is filled, to determine a second distance between the sensor unit and the main unit, and to adjust a rate of adding the material to the tank based on the level of the material in the tank;
    wherein at least one of the sensor unit and the main unit is configured to use wireless signals that are reflected by the reference finger to compensate for variations in a medium within the tank; and
    wherein the sensor unit comprises:
        a filter configured to filter electrical signals representing the wireless signals reflected off the material;
        an amplifier configured to amplify an output of the filter;
        an envelope filter configured to filter an output of the amplifier based on a strength of the output of the amplifier;
        a buffer configured to buffer an output of the envelope filter;
        a derivative unit configured to determine a derivative of an output of the buffer;
        a zero-crossing detector configured to detect zero crossings in the output of the buffer using the derivative of the output, wherein consecutive zero crossings define a measuring window; and
        a control system configured to generate a count value using a counter, the control system configured to start and stop the counter based on the zero crossings, the control system also configured to determine a time difference between when the wireless signals are transmitted and received using the count value and to determine the distance between the sensor unit and the material based on the time difference.

12. The apparatus of claim 11, wherein the sensor unit is configured to transmit the wireless signals through the emitting surface and through the medium.

13. The apparatus of claim 12, wherein a concentrator is configured to at least one of: focus the wireless signals toward the material and focus the reflected wireless signals toward the sensor unit.

14. The apparatus of claim 11, wherein:
the sensor unit is further configured to determine the first distance and to communicate the first distance to the main unit; and
the main unit is further configured to determine the level of the material in the tank using the first and second distances.

15. The apparatus of claim 11, wherein the main unit comprises a drum; and
further comprising a tape coupling the main unit and the sensor unit, the sensor unit raised and lowered based on rotation of the drum.

16. The apparatus of claim 15, wherein the main unit further comprises a distance measuring unit configured to measure an angle of the tape with respect to the drum and determine the second distance based on the measured angle.

17. The apparatus of claim 11, wherein the sensor unit further comprises a transducer configured to generate ultrasonic wireless signals.

18. The apparatus of claim 11, wherein:
the sensor unit is configured to determine the first distance using an ultrasonic measurement technique; and
the main unit is configured to determine the second distance using a non-contact servo measurement technique.

19. A system comprising:
a sensor unit configured to be raised and lowered in a tank capable of receiving a material, the sensor unit also configured to generate wireless signals for determining a first distance between the material and the sensor unit, the sensor unit further configured to determine the level of the material in the tank as the tank is filled, the sensor unit comprising a reference finger that is disposed at a known distance from an emitting surface of the sensor unit;
a main unit configured to lower the sensor unit into the tank, raise the sensor unit as the tank is filled, determine a second distance between the sensor unit and the main unit, determine a level of the material in the tank using the first and second distances, and adjust a rate of adding the material to the tank based on the level of the material in the tank;
a connection physically coupling the sensor unit to the main unit; and
a communication unit configured to communicate with the main unit and to communicate over a communication link;
wherein at least one of the sensor unit and the main unit is configured to use wireless signals that are reflected by the reference finger to compensate for variations in a medium within the tank; and
wherein the sensor unit comprises:
a filter configured to filter electrical signals representing the wireless signals reflected off the material;
an amplifier configured to amplify an output of the filter;
an envelope filter configured to filter an output of the amplifier based on a strength of the output of the amplifier;
a buffer configured to buffer an output of the envelope filter;
a derivative unit configured to determine a derivative of an output of the buffer;
a zero-crossing detector configured to detect zero crossings in the output of the buffer using the derivative of the output, wherein consecutive zero crossings define a measuring window; and
a control system configured to generate a count value using a counter, the control system configured to start and stop the counter based on the zero crossings, the control system also configured to determine a time difference between when the wireless signals are transmitted and received using the count value and to determine the distance between the sensor unit and the material based on the time difference.

20. The system of claim 19, wherein the communication unit is configured to communicate over a wireless communication link.

21. The system of claim 19, wherein the sensor unit is configured to transmit the wireless signals through the emitting surface and through the medium.

22. The system of claim 19, wherein:
the sensor unit is configured to determine the first distance using an ultrasonic measurement technique; and
the main unit is configured to determine the second distance using a non-contact servo measurement technique.

* * * * *